United States Patent
Van Buren, Jr.

[11] 3,730,571
[45] May 1, 1973

[54] KNOB FASTENER

[75] Inventor: Harold S. Van Buren, Jr., Lexington, Mass.

[73] Assignee: TRW Inc., Cleveland, Ohio

[22] Filed: Feb. 28, 1972

[21] Appl. No.: 229,730

[52] U.S. Cl. ..................287/53 H, 74/548
[51] Int. Cl. ..................F16d 1/06
[58] Field of Search............287/53 H; 74/548, 74/553; 292/353, 349; 339/258 R, 256 R, 258 RR, 258 A

[56] References Cited

UNITED STATES PATENTS 2,745,689  5/1956  Balint et al. ...........287/53 H
3,329,452  7/1967  Ammon....................287/53 H

FOREIGN PATENTS OR APPLICATIONS 819,266   10/1951  Germany................339/258 RR
795,479    5/1958  Great Britain...........292/349

Primary Examiner—Andrew V. Kundrat
Attorney—James R. O'Connor et al.

[57] ABSTRACT

A fastener for releasably coupling a shaft end to a knob, handle or the like cooperating member, and wherein, the fastener has a hollow housing portion for receiving the shaft and a pair of bandlike means thereon connected by a depressed resilient web providing a leaf spring connection with the body.

7 Claims, 6 Drawing Figures

PATENTED MAY 1 1973  3,730,571

KNOB FASTENER

BACKGROUND OF THE INVENTION

1. Field of the Invention

The invention relates generally to fasteners of the type exemplified by patents found in U.S. Art Class 287, entitled "Rod Joints or Couplings" and more specifically to fasteners of the type found in Subclass 53 of said class, subtitled "Shaft end attached"

2. Brief Description of the Prior Art

The prior art includes numerous fasteners for securing knobs or handles to shaft ends. Those which are related to the present disclosure are frequently termed knob retaining springs. The distantly related springs are adapted to positively lock to the shaft, for example, by a detent or pawl snap seating in a notch in the shaft. Springs of this type are utilized in applications where the knobs or handles are subjected to repeated axial pull, for example, the knob on an automobile break release linkage or floor mounted gear shift lever. The positive lock is highly desirable to inhibit accidental removal of the knobs or handles even when a very substantial and abrupt axial pull and/or twist is exerted thereon.

More closely related springs are of the type which rely on a binding or frictional engagement of the shaft. Such springs are utilized with control knobs in many electronic assemblies and particularly on domestic appliances, for example, in conjunction with tuners for radios, television sets, etc. The springs are ideally designed to maintain the knob-to-shaft connection under normal usage conditions, but disengage from the shaft when subjected to increased deliberate or accidental axial pull and also be easily pushed onto the shaft incident to initial assembly or later replacement. Thus the likelihood of accidental damage to a control mechanism such as a tuner is minimized and the knobs can readily be detached to permit removal of covers, back panels, etc., incident to the repair or replacement of internal components of the appliance. My investigation of the previously known springs of the press or frictional fit type indicated that the ideal spring for these applications had not yet been developed, particularly in that prior art springs were not sufficiently tolerant of manufacturing variations in shaft ends and/or knob or handle cavities in which the springs are seated. Consequently, with a maximum high side variation in shaft size, the connection was frictionally too tight, did not readily release under reasonable axial pull, required excessive force incident to pushon or insertion and therefore increased the possibility for internal component damage, whereas, with a maximum low side variation in shaft size, the connection was frictionally so loose that the knobs inadvertently fell off or disengaged under a very light pull.

The principal object of this invention is therefore to provide an improved knob spring which is extremely tolerant of manufacturing variations in shaft ends and/or knob cavities. Tests conducted to date establish that the above objective has been realized. In assemblies wherein springs of the present type were utilized with specified shaft sizes and knob cavities, the force required to push the knobs onto the shaft or remove same therefrom was shown to vary minimally, i.e., on the order of 10 lbs., between the maximum and minimum shaft end manufacturing tolerance limits, whereas, the average variation of force required in similar assemblies wherein prior art fasteners were utilized was substantially greater, in certain instances being as great as 50 lbs.

Thus, the present invention is seen to represent a definite improvement in the art. Its merits will be further appreciated by one who proceeds to a reading of the detailed description which follows hereinafter.

SUMMARY OF THE INVENTION

A fastener for releasably coupling a shaft end to a knob, handle or the like cooperating member, wherein the member has an open end cavity formed therein. The fastener includes a hollow housing having the general cross-sectional configuration of the cavity in the member and the shaft end to be received therein. The fastener includes barblike projections adapted to engage the wall of the cavity in a cooperating member for retention of the fastener therein. The shaft receiving housing is at least partially defined by resilient bandlike means disposed adjacent opposite ends thereof and a plurality of inwardly bent webs extending between the bandlike means. The bandlike means adjacent the end of the housing opposite the shaft entering end are disconnected from the housing and in cooperation with the webs comprise a plurality of leaf springs having free ends adjacent the said opposite end of the housing, which free ends normally project inwardly toward the longitudinal axis of the housing. Thus, the leaf springs are adapted to be deflected into tensional frictional engagement with a shaft end inserted into the housing to securely but releasably retain the member in assembly with the shaft.

DESCRIPTION OF A PREFERRED EMBODIMENT

Figure 1:
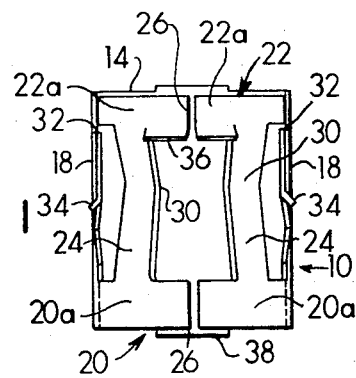
FIGS. 1, 2 and 3 are a top plan, a side elevational, and an end view of a knob fastener according to the invention, with FIG. 3 depicting the fastener as seen looking from the lower end of FIGS. 1 and 2.

In the drawing a preferred embodiment of the invention is depicted as employed to connect a knob 2 to a shaft 4 which may control the operation of an appliance component, e.g., the tuner of a television set responsive to a rotation or push-pull force exerted on the knob. In a typical installation, the switch per se would usually be mounted in the television chassis behind a removable front plate or back panel through which a portion of the shaft extends to permit operation by one grasping the knob and applying the requisite turning or push-pull motion thereto.

The knob 2 is cast or molded from any convenient material and in any desired external configuration and is specifically depicted as being of a molded, synthetic plastic construction. The knob is hollow at its center in that an open ended cavity 6 is formed therein. The cavity 6 has a D-shaped configuration throughout its length as is best seen in the cross-sectional views of FIGS. 5 and 6. The shaft 4 is a metallic rod having its end machined to provide a D-shape generally corresponding to the shape of the knob cavity.

Figure 2:
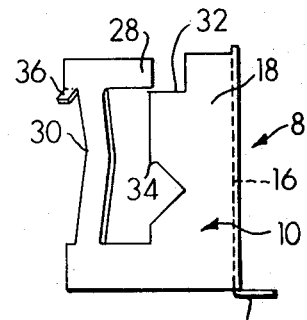
Figure 3:
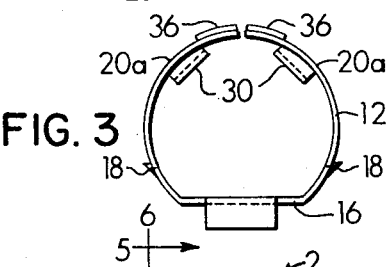
Figure 4:
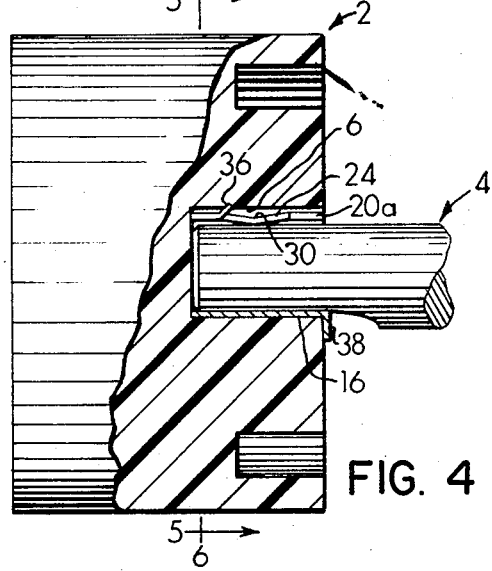
FIG. 4 is a transverse cross-sectional view of a typical assembly wherein the fastener according to the invention is utilized to secure a knob to a shaft end, with the shaft being depicted in full.

Referring now more particularly to FIGS. 1, 2 and 3, there is depicted therein the improved fastener 8 which is a onepiece formed stamping of relatively thin spring metal, e.g., inch inch thick tempered, carbon steel. The fastener comprises a relatively rigid D-shaped shaft receiving housing 10 having a shaft entering open end 12, a rearward open end 14, a generally flat base 16, upstanding arcuate sides 18 joined to the base 16 and extending between the aforesaid ends, bandlike means 20 and 22, the former being joined to the sides 18 and extending arcuately upwardly therefrom adjacent the housing end 12, and a plurality of resilient webs 24 joined to and extending longitudinally between the bandlike means 20,22.

As is best seen in FIG. 1, the housing 10 is longitudinally split at 26 so that each of the bandlike means is divided into band sections 20a and 22a, respectively. The lower ends 28 of the band sections 22a are severed from the sides 18 so that the said band sections are supported in cantilever fashion through their connection to band sections 20a through webs 24. Thus, the webs 24 and band sections 22a cooperatively provide a pair of leaf springs extending longitudinally of the housing 10 from band section 20a approximately to the rearward open end 14 of the housing. Further, each of the webs 24 is bent inwardly toward the axis of the housing, with the intermost points 30 on the webs lying in a plane transverse the longitudinal axis of the housing but disposed beyond the midpoint of the housing toward the rearward end 14 thereof. The functional advantages to be derived by the inwardly bent configuration of the webs and the aforesaid location of the apices of the bends will be detailed hereinafter.

One will observe that the rearwardmost ends of the upper portions of the sides 18 are notched at 32 and that the lowermost ends 28 of the bend sections 22 lie adjacent the notches when the spring is in a freestanding condition. Further, a pair of barbs 34 are stuck angularly outwardly from the uppermost portions of the sides 18 and the barbs extend forwardly toward the shaft entering end 12 of the housing. Similarly, a pair of tabs 36 are bent upwardly and extend forwardly from the inboard edges of band sections 22 between the webs 24 and adjacent the slit 26. The purpose of barbs 34 and tabs 36 will be explained hereinafter. Lastly, a narrow lip 38 is bent downwardly in a substantially arcuate bend from the medial lateral portion of the forward end of the base 16 of the housing.

Figure 5:
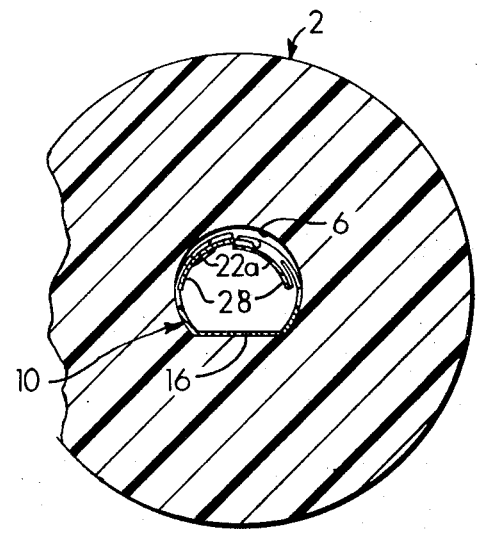
FIG. 5 is a cross section taken on line 5—5 of FIG. 4 depicting a subassembly of the fastener and a knob.
Figure 6:
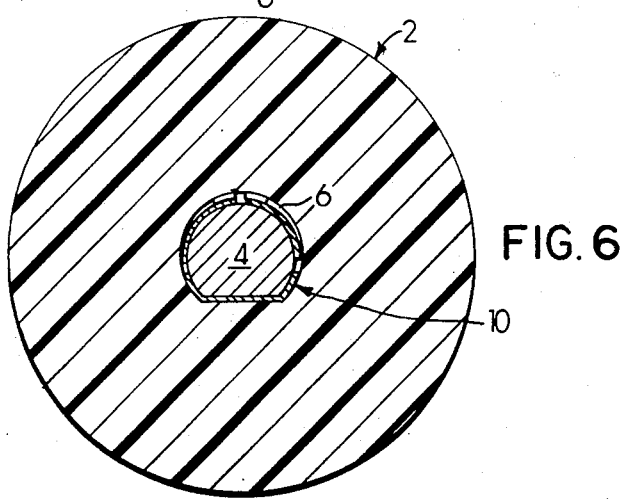
FIG. 6 is a cross section of the assembly taken on line 6—6 of FIG. 4.

FIG. 5 depicts what is essentially a rearward end view of the fastener fully seated in the cavity 6 in the knob 2 to the extent that lip 38 bears on the face of the knob adjacent the entrance to the cavity and acts as a stop limiting the depth of permissible insertion of the fastener. Barbs 34 which bitingly engage the internal side walls of the knob defining the cavity inhibit unintentional displacement of the fastener from its seat in the knob. The assembly of the knob and fastener may be packaged, shipped, stored, etc., by a subassembly manufacturer prior to connection to a shaft by an end user. The dimensional relationship between the knob cavity and the fastener is ideally predetermined to provide for a tight fit of the fastener in the cavity to the extent that one of the leaf springs of the fastener is depressed further inwardly toward the axis of the housing 8 and, as viewed in FIG. 5, one of the free end band sections 22a is deflected laterally so as to underlie the other of said free band sections.

The connection of the knob and fastener subassembly to the shaft 4 is accomplished by inserting the D-shaped end of the shaft into the open end 12 of the fastener housing. The lip 38 and particularly its upper arcuate bend provides a lead-in to the housing and thus facilitates initial shaft insertion. Ideally, the D-shaped end of the shaft is so dimensioned that the flat side thereof slides over the base 16 of the housing and minimal frictional resistance to insertion is encountered up to the point where the leading end of the shaft passes the forward band sections 20a and the upper, rounded surface of the shaft end begins to engage the undersurfaces of the inwardly bent webs 24. Thereafter, the frictional resistance progressively increases as the shaft end penetrates beyond the most inwardly extending points 30 of the webs 24 and continued shaft penetration precipitates an upward deflection of the leaf springs including the band sections 22a at the rearward end of the housing. The upward deflection of the last mentioned band sections causes tabs 36 to engage and dig into the roof of the cavity 6 in the knob thereby further enhancing the retention of the fastener in the cavity and equally, if not more importantly, inhibiting further upward deflection of the leaf springs so that the latter are firmly tensioned against the shaft end. From a comparison of FIGS. 5 and 6, one will observe that the extent of upward deflection of the inwardlymost depressed leaf spring, i.e., that depicted to the right in FIG. 5, is greater than the other leaf spring, and one will further appreciate that upward deflection of the rightward spring commences relatively somewhat earlier during the insertion time interval. To prevent any possible binding of the rightward (in FIG. 5) band section 22a and permit relatively unimpeded upward deflection of the leaf springs, the notches 32 were cut out of the sides 18 of the housing proximate the free ends 28 of the band sections 22a. As was earlier mentioned, the most inwardly extending points 30 on the webs 24 are disposed rearwardly of the midpoint of the longitudinal axis of the fastener housing toward the open end 14 thereof. This arrangement has the advantage of delaying appreciable build up of frictional resistance incident to the pushing of a knob and fastener subassembly onto a shaft end until the shaft has penetrated substantially one-half of the overall length or depth of the fastener housing. The effect is to considerably minimize the potential for damage to the components operated by the shaft which might otherwise occur if excessive, continuous force were required over the entire sequence of shaft insertion or knob push-on as the case may be. A further advantage lies in the fact that by the time an installer begins to encounter appreciable frictional resistance, the knob is substantially fully seated on the shaft, ergo one is less likely to erroneously conclude that the shaft is fully seated in what is essentially a "blind" application, as might be the case if one were to feel substantial frictional resistance at a point where the shaft had penetrated less than one-half the depth of the fastener housing. In other words, the invention provides for relatively free sliding penetration of the shaft over approximately one-half the length of the fastener housing and a short thrust of increased force against the resistance of the leaf springs to achieve full shaft insertion.

While the advantages of the improved spring mentioned above are of considerable importance, its major contribution to the art is seen to reside in its tolerance of manufacturing variations in the components to be joined. The described structure, particularly the cantilevered leaf springs terminating in free band sections 22a, renders the fastener adaptable for efficient usage even in situations wherein the outside, specified, critical dimensions of the components prevail, that is, when the internal transverse dimensions of the cavity and the external transverse dimensions of the shaft are on the high side and low side, respectively, and vice versa. When the former conditions prevail, the cantilevered leaf springs will provide a minimal insertion and retention force of approximately 5 lbs which is, of course, relatively small, but nevertheless within the industry standards of retention required for installations in which the fastener is utilized. Conversely, when the latter condition, i.e., minimum knob cavity size and maximum shaft end size, prevails, a maximum of 15 lbs. insertion and retention force, which is also well within industry standards, will obtain. The latter condition is of course the most critical to accommodate in that increased force required for push-on or removal of a knob increases the potential for damage to delicate electronic components. Under the last mentioned conditions a seated shaft will not only deflect the leaf springs upwardly to at least the position depicted in FIG. 6, but will also tend to reversely bend, i.e., straighten, the inwardly bent webs 34. If the band sections 22a were anchored to the fastener housing, as is characteristic of certain of the prior art devices employing what are referred to in the trade as "banana" springs, the tension on the shaft would increase rapidly and markedly to an excessive degree since the webs 24 could only tend to straighten or invert, i.e., deflect in a radial direction relative to the axis of the housing while remaining fixed at both ends. Since the band sections 22a are free, however, the leaf springs of the present device are free to elongate longitudinally relative to the housing axis responsive to a radial force tending to straighten or invert the webs 24 at points 30. Ergo, while there is an appreciable increase in tension in a connection embodying the present device, the increase is not excessive and the knob push-on and retention forces remain within acceptable industry standards for the types of installations contemplated.

Although a preferred embodiment of the invention has been described in detail, variations in structure within the scope of the appended claims are possible and are contemplated. There is no intention, therefore, to limit the scope of the invention to the limited disclosure herein made.

I claim:

1. A fastener for coupling a shaft end to a cooperating member having a cavity formed therein, which cavity has a cross-sectional contour generally corresponding to the cross section of the shaft end to be received therein, said fastener being formed of springy sheet metal and comprising a hollow housing having a cross-sectional contour generally corresponding to the shaft end, which housing is adapted to be inserted into the cavity in the member to be coupled to the shaft, said housing being formed with means for retaining said housing in the cavity, and means for frictionally engaging and releasably retaining the shaft end received within said housing, said last mentioned means including generally arcuate bandlike means disposed at the opposite ends of said housing and at least one resilient web extending between and connected to said bandlike means and extending generally longitudinally of said housing, said bandlike means at one end of said housing being joined to said housing solely through said web's jointure with said bandlike means at the opposite end of said housing and said bandlike means at the opposite end of said housing being a circumferential extension of said housing body, said web and said bandlike means at said one end of said housing cooperatively comprising leaf spring having a free end at said one end of said housing, said web being progressively depressed inwardly of said housing between its points of jointure with said bandlike means, the furthest inwardly depressed portion of said web being located intermediate and substantially longitudinally spaced from said bandlike means to provide for a progressively increasing frictional engagement of the shaft end as the latter is inserted into said housing.

2. A fastener according to claim 1 wherein the furthest inwardly depressed portion of said web is located in a plane transverse the longitudinal axis of said housing at a point along the axis lying more closely proximate the free end of said leaf spring than the midpoint of the said axis.

3. A fastener according to claim 1 wherein a plurality of spaced webs are joined to and extend between said bandlike means and said bandlike means adjacent the said one end of said housing is severed to provide in effect a plurality of leaf springs having free ends adjacent said one end of said housing.

4. A fastener for coupling a shaft end to a cooperating member having a cavity formed therein, which cavity has a cross-sectional contour generally corresponding to the cross section of the shaft end to be received therein, said fastener being formed of springy sheet metal and comprising a hollow housing having a cross-sectional contour generally corresponding to the shaft end, which housing is adapted to be inserted into the cavity in the member to be coupled to the shaft, said housing being formed with means for retaining said housing in the cavity and means for frictionally engaging and releasably retaining the shaft end received within said housing, said last mentioned means including bandlike means disposed adjacent the ends of said housing and at least one resilient web connected to said bandlike means and extending generally longitudinally of said housing, portions of said web and said bandlike means projecting inwardly of said housing to provide for a progressively increasing frictional engagement of the shaft end as the latter is inserted into said housing, said bandlike means adjacent one end of said housing being joined to said housing solely through said web's jointure with said bandlike means adjacent the opposite end of said housing, at least a portion of said housing having a generally D-shaped configuration as viewed from either end thereof, said portion having a generally flat base and opposed sides extending upwardly from and transversely inwardly of said base, said bandlike means adjacent said opposite end of said housing being joined to said sides and extending arcuately upwardly therefrom to the apex of said D-shaped portion, and said sides having opposed notches formed in the upper portions thereof adjacent said one end of said housing, said bandlike means adjacent said one end of said housing extending downwardly in an arced configuration from the apex of said D-shaped portion and terminating in free lateral edges spaced from said sides and lying proximate the edges of said sides defining said notches.

5. A fastener according to claim 4 wherein the said means for retaining said housing in the cavity in the cooperating member includes barbed projections struck laterally outwardly from said sides and extending longitudinally from said sides in the direction of said opposite end of said housing.

6. A fastener according to claim 5 wherein said means for retaining said housing in the cavity in the cooperating member additionally comprises projections joined to said bandlike means adjacent said one end of said housing and extending upwardly therefrom at an acute angle and longitudinally in the direction of the said opposite end of said housing, the said projections being particularly adapted for bitingly engaging the wall of the cavity in the cooperating member responsive to insertion of the shaft end into said housing.

7. A fastener according to claim 4 wherein said housing includes a lip joined to said base portion adjacent the said opposite end of said housing and bent downwardly therefrom to provide a stop limiting the extent to which said housing is inserted into the cavity in the cooperating member, the bend in said lip being generally arcuate to provide a ramped surface facilitating initial insertion of the shaft end into said housing.

* * * * *